United States Patent Office 3,302,532
Patented Feb. 7, 1967

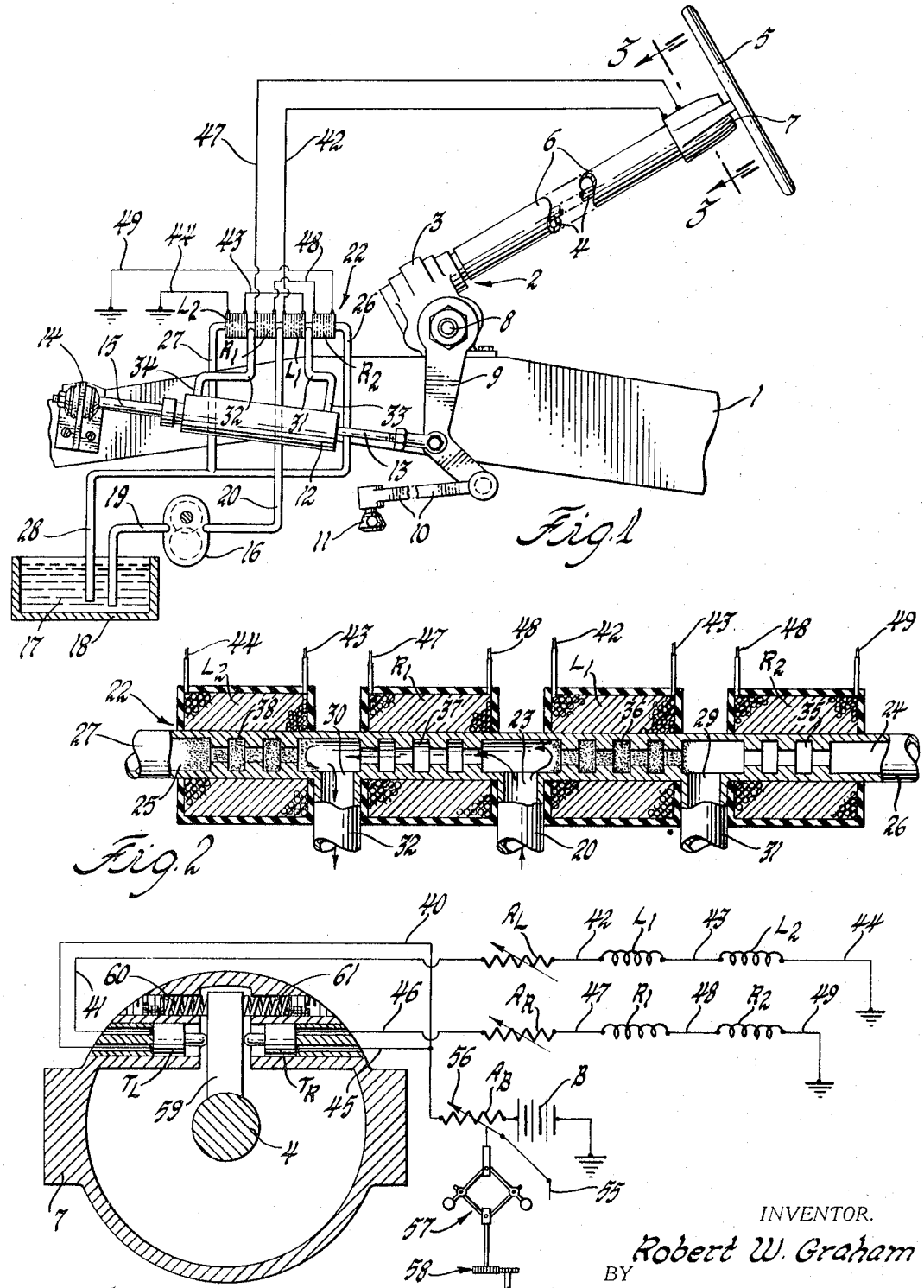

3,302,532
ELECTROHYDRAULIC POWER STEERING SYSTEM
Robert W. Graham, Birmingham, Mich., assignor to General Motors Corporation, Detroit, Mich., a corporation of Delaware
Filed June 20, 1966, Ser. No. 563,006
3 Claims. (Cl. 91—459)

This application is a continuation-in-part of my earlier copending application Serial No. 401,948, filed October 6, 1964.

This invention relates generally to hydraulic servo systems and more particularly to a hydraulic power steering system employing a hydraulic fluid having ferromagnetic properties and including electromagnet means for selectively magnetizing the fluid and control means for the magnets, in lieu of the conventional mechanical valve control of the hydraulic steering motor.

The primary object of this invention is to provide a new and improved hydraulic servo system including a two-way hydraulic motor, a source of pressurized hydraulic fluid having ferromagnetic properties, and electromagnetic valve means, with only two fluid lines being connected between the motor and the valve means, each line serving selectively as either a return or pressure line. More specifically, it is an object to apply a system according to the foregoing for use in power steering of vehicles and reduce the number of hydraulic lines in the vehicle to a minimum, locate the steering input means controlling the valve means at any desired point in the mechanical steering linkage, and enable adjustment of the amount of power available in the servo system either manually or in accordance with vehicle speed.

These and other objects and advantages of the invention will be more clearly understood from the following description of one preferred embodiment thereof, having reference to the drawing wherein:

FIGURE 1 is a side view, partly schematic, of an automotive vehicle steering system incorporating the hydraulic power and control means of my invention.

FIGURE 2 is an enlarged schematic view of the electromagnetic valve means shown in FIGURE 1 for controlling the application of hydraulic pressure to the steering motor.

FIGURE 3 is an enlarged cross-sectional view through the steering wheel hub and steering shaft of the mechanism shown in FIGURE 1, schematically illustrating the force-current transducers associated therewith, their connections with the other electrical components of the system and the adjustment means for the supply current.

Referring now in detail to the drawing, there is shown mounted on a vehicle frame 1 a steering mechanism generally designated by the numeral 2, comprising the usual steering gear 3 which is manually operable through a steering shaft 4 by turning a wheel 5. The numeral 6 denotes the conventional mast jacket which encloses and supports the steering shaft 4 and extends from the gear 3 to the steering wheel hub 7. Rotation of the shaft 4 by the wheel 5 effects rotation of a pitman shaft 8 extending laterally outward of the gear 3, and fixed to rotate with this shaft 8 is the usual pitman arm or steering input member 9. Rotation of the latter, in turn, actuates a steering output member shown in the form of a drag link 10 connected at one end to the member 9 and provided at the opposite end with a stud 11 for pivotally connecting it to the steering arms, not shown, of the dirigible wheels of the vehicle.

A hydraulic motor 12, in the form of a two-way power cylinder, has an output member or piston whose rod 13 is pivotally linked to the input member 9. The cylinder is secured to a bracket 14 on the frame by a stud 15. A source of hydraulic fluid pressure is schematically illustrated in the form of a gear type pump 16 conventionally driven by the vehicle engine, not shown, it being understood that other types of pumps may be found preferable depending on the nature of the specific ferromagnetic fluid used in the system. Hydraulic fluid 17 is drawn into the pump from a reservoir 18 via a suction line 19 and delivered via a discharge line 20 to valve means designated generally by the numeral 22. The hydraulic fluid 17 may consist of a suitable oil or other liquid in which is interspersed a quantity of discreet particles of a magnetic material of low retentivity such as soft iron, in sufficient number or density to enable the particles when lightly magnetized to substantially reduce the flowability of the liquid, or preclude all flow thereof when the particles are strongly magnetized.

As is best shown in FIGURE 2, the valve 22 comprises a housing or body, again preferably of soft iron, having an inlet 23 connected to the pump discharge line 20, a pair of outlets 24 and 25 which are respectively connected by return lines 26 and 27 leading to a common line 28 for return of the fluid to the reservoir, and a pair of outlets 29 and 30 which respectively connect with the power cylinder via lines 31 and 32. These connections are shown at 33 and 34 on the power cylinder in FIGURE 1.

Within the valve 22, passages 36 and 37 respectively connect the valve inlet 23 with its cylinder outlets 29 and 30, and additional passages 35 and 38 connect these cylinder outlets with the reservoir return outlets 24 and 25. Annular grooves are formed in the several passages to aid in the collection or retention therein of the particles when magnetized. Surrounding each of these passages 35, 36, 37 and 38 in the valve are respective electrical coils $R_2$, $L_1$, $R_1$ and $L_2$ serving as electromagnets in controlling the routing of the pressure fluid through the valve, as hereinafter described.

The coil $L_2$, as shown in FIGURE 3, is connected at one end by the wire 44 to ground. Its other end is connected in series with the coil $L_1$ by the wire 43. Both these two coils are, in turn, connected in series by the wire 42 with a current adjuster $A_L$, and by the wire 41 to one side of a pressure responsive transducer $T_L$ such as a carbon pack or the like. The other side of the transducer is connected by the wire 40 with a current source, battery B, through a main current supply adjuster $A_B$. The opposite side of the battery B is connected to ground as shown. Similarly, coils $R_1$, $R_2$, current adjuster $A_R$ and transducer $T_R$ are connected in series with the main adjuster $A_B$ and the battery B by wires 45, 46, 47, 48 and 49. The current adjusters $A_L$ and $A_R$ may be simple manually operable rheostats, as may also the main current adjuster $A_B$. However, in combination with such manual means as the linkage 55 for manually controlling the main adjuster $A_B$, the control element 56 thereof may also be linked to a speed governor indicated generally by the numeral 57, which is driven as by gearing 58 at speeds varying in accordance with the vehicle speed.

Also, while the transducers $T_L$ and $T_R$ are shown mounted in the steering hub 7 for operation by the arm 59 on the steering shaft 4 in response to right and left turn movements of the latter, it will be appreciated that these transducers could alternatively be located at various other points in the system where they would be responsive to manually induced movements of the steering wheel. For example, they might suitably be arranged within the housing of the steering gear 3 where they would be responsive to thrust movements of the conventional steering worm (not shown), on opposite fore and aft sides of the pitman arm 9, etc. In the particular arrangement illustrated in FIGURE 3, centering springs 60 and 61 are arranged to oppositely oppose movements of the arm 59, and thereby act to return the shaft 4 to its neutral position following completion of the turn.

With the steering wheel and shaft 4 in its neutral or centered position, and the electrical elements in circuit as represented in FIGURE 3, adjustment or "trimming" of the valve 22 is effected by setting the adjusters $A_L$ and $A_R$ such that the energization of the electromagnet coils $L_1$ and $L_2$ approximately balance that of the coils $R_1$ and $R_2$. The amount of "boost" to be made available (within the power supply limits of the battery B) in assisting manual steering effort derived from turning the steering wheel 5 is adjustable by regulation of the main current adjuster 56. As aforementioned, this may be accomplished manually by control of the linkage 55, or automatically in accordance with the speed of the vehicle through the governor 57. Thus, for example, at high vehicle speeds where little "boost" may be desired, the governor would serve to reduce the rate of energization of the electromagnet coils in proportion to the extent of turning the steering wheel, while at lower speeds and during vehicle parking operations such rate would be higher to provide additional "boost."

To the extent such energization is effected of the coils $L_1$ and $L_2$, say for making a vehicle "left" turn, the flow of the ferromagnetic fluid through the valve passages 36 and 38 is restricted, whereas such flow through the passages 35 and 37 is relatively unrestricted. As a result, flow of the fluid into the valve from the pump via the line 20 and out the line 32 to one end of the hydraulic power cylinder 12, and return of fluid from the opposite end of the latter via the line 31, passage 35 and back to the reservoir via lines 26 and 28, acts to move the piston rod in the direction to assist or "boost" manually induced movement of the pitman arm 9, drag link 10, etc. Conversely, during a "right" turn, the coils $R_1$ and $R_2$ would be energized and coils $L_1$ and $L_2$ deenergized, resulting in restricting fluid flow through the passages 35 and 37, while accommodating such flow through the passages 36 and 38, with the result that such "boost" is applied in the "right" turn direction. By using low retentivity magnetic material for the particles in the fluid and for the valve body, instant and complete response or demagnetization is insured in valve 22 to deenergization of the several coils as the vehicle turns are completed.

It is appreciated that various changes in the specific arrangement shown will readily suggest themselves to persons skilled in the art, without departing from the spirit and scope of my invention which I now claim:

1. In a hydraulic system, a source of hydraulic fluid containing discreet magnetizable particles of low retentivity and operative when magetized to impede flow of said fluid, a pump, a two-way hydraulic motor having two fluid connections, each adapted to receive or return pressure fluid in accordance with the direction of motor operation, a valve having an inlet for receiving fluid under pressure from said pump, said valve further having two openings connected to said motor connections, two outlets for return of fluid to said source, two passages connecting said inlet to said openings and two passages connecting said openings to said outlets, electromagnet means adjacent each said passage and energizable to magnetize the particles in the fluid therein, a source of electric current, and means operable to regulate energizing current to the electromagnet means adjacent the passage connecting said inlet to one of said openings and to the electromagnet means adjacent the passage connecting one of said outlets to the other of said openings for controlling movement of said motor in one direction thereof, and operable to regulate energizing current to the other two of said electromagnet means for controlling movement of said motor in the other direction thereof.

2. In a hydraulic steering system, a source of fluid under pressure and containing discrete magnetizable particles of low retentivity and operative when magnetized to impede flow of the fluid, a steering driven member, a steering input member operative to actuate said driven member in either steering direction, a two-way hydraulic motor having an output member linked to drive said driven member and having two fluid connections, each adapted to receive or return pressure fluid in accordance with the direction of motor operation, a valve having an inlet for receiving fluid under pressure from said source, two openings connected to said motor connections and two outlets for return of fluid to said source, said valve having two passages connecting said inlet to said openings and two passages connecting said openings to said outlets, an electromagnet adjacent each said passage and energizable to magnetize the particles in the fluid therein, a source of electric current, and means responsive to actuation of said steering input member in one direction to apply energizing current to the magnet adjacent the passage connecting said inlet to one of said openings and to the magnet adjacent the passage connecting one of said outlets to the other of said openings, and responsive to actuation of said input member in the opposite direction to apply energizing current to the other two of said magnets.

3. The invention of claim 2, together with adjustable means electrically in circuit with said current source and magnets for limiting the energizing current applicable to said magnets, said adjustable means being operable independently of actuation of said input member.

References Cited by the Examiner
UNITED STATES PATENTS

| 2,651,258 | 8/1953 | Pierce | 192—21.5 |
| 2,661,596 | 12/1953 | Winslow | 60—52 |
| 2,692,582 | 10/1954 | Curci | 137—251 X |

EDGAR W. GEOGHEGAN, *Primary Examiner.*

B. L. ADAMS, *Assistant Examiner.*